(12) United States Patent
Tani et al.

(10) Patent No.: US 8,917,443 B2
(45) Date of Patent: Dec. 23, 2014

(54) WAVELENGTH CONVERTING DEVICES

(71) Applicant: NGK Insulators, Ltd., Aichi-prefecture (JP)

(72) Inventors: Minori Tani, Nagoya (JP); Keiichiro Asai, Nagoya (JP); Shoichiro Yamaguchi, Ichinomiya (JP)

(73) Assignee: NGK Insulators, Ltd., Aichi-prefecture (JP)

(*) Notice: Subject to any disclaimer, the term of this patent is extended or adjusted under 35 U.S.C. 154(b) by 0 days.

(21) Appl. No.: 14/145,077

(22) Filed: Dec. 31, 2013

(65) Prior Publication Data
US 2014/0177035 A1    Jun. 26, 2014

Related U.S. Application Data

(63) Continuation of application No. PCT/JP2013/064815, filed on May 22, 2013.

(60) Provisional application No. 61/692,278, filed on Aug. 23, 2012.

(51) Int. Cl.
*G02F 1/35* (2006.01)
*G02F 1/377* (2006.01)
*G02F 1/37* (2006.01)

(52) U.S. Cl.
CPC ............... *G02F 1/3775* (2013.01); *G02F 1/37* (2013.01)
USPC .......................................... 359/328; 359/332

(58) Field of Classification Search
None
See application file for complete search history.

(56) References Cited

U.S. PATENT DOCUMENTS

| | | | |
|---|---|---|---|
| 5,652,674 A * | 7/1997 | Mizuuchi et al. | 359/326 |
| 5,703,710 A | 12/1997 | Brinkman et al. | |
| 5,838,486 A * | 11/1998 | Sonoda et al. | 359/332 |
| 5,852,688 A | 12/1998 | Brinkman et al. | |
| 6,393,172 B1 | 5/2002 | Brinkman et al. | |
| 6,522,794 B1 * | 2/2003 | Bischel et al. | 385/4 |
| 6,885,687 B2 * | 4/2005 | Hayakawa | 372/45.01 |
| 2006/0233206 A1 * | 10/2006 | Miner et al. | 372/22 |
| 2008/0316590 A1 * | 12/2008 | Mizuuchi et al. | 359/328 |
| 2009/0231679 A1 | 9/2009 | Yoshino | |

(Continued)

FOREIGN PATENT DOCUMENTS

| | | |
|---|---|---|
| JP | 10-507281 A | 7/1998 |
| JP | 2009-222963 A | 10/2009 |

(Continued)

OTHER PUBLICATIONS

International Search Report for PCT Patent App. No. PCT/Jp2013/064815 (Aug. 20, 2013).

(Continued)

*Primary Examiner* — Hemang Sanghavi
(74) *Attorney, Agent, or Firm* — Cermak Nakajima & McGowen LLP; Tomoko Nakajima (57) ABSTRACT

It is provided a wavelength converting device comprising a periodic domain inversion structure for converting a wavelength of a fundamental wave to generate a harmonic wave. The wavelength conversion device includes a ferroelectric substrate and the periodic domain inversion structure formed in the ferroelectric substrate. A vertical domain inversion boundary of the periodic domain inversion structure is inclined with respect to a normal line of an upper face of the ferroelectric substrate, provided that the ferroelectric substrate is viewed in a cross section parallel with a propagating direction of the fundamental wave and parallel with the normal line of the upper face.

7 Claims, 10 Drawing Sheets

(56) References Cited

U.S. PATENT DOCUMENTS

2012/0063477 A1    3/2012    Suyama et al.
2012/0134012 A1    5/2012    Guerin et al.

FOREIGN PATENT DOCUMENTS

| | | |
|---|---|---|
| JP | 4646333 B2 | 12/2010 |
| JP | 2012-058578 A | 3/2012 |
| JP | 2012-118528 A | 6/2012 |

OTHER PUBLICATIONS

English translation of Written Opinion of the International Searching Authority for PCT Patent App. No. PCT/JP2013/064815 (Aug. 20, 2013) with Certification of translation.

\* cited by examiner

Fig. 9 ized using hydrofluoric acid, it was proved that the domain inversion structure is formed only in the upper face side of the wavelength converting device and the depth of the domain inversion structure in the substrate is shallow. Although the reason is not certain, it is considered that the following fact is related with such phenomenon.

WAVELENGTH CONVERTING DEVICES

TECHNICAL FIELD OF THE INVENTION

The present invention relates to a wavelength conversion device.

RELATED ART

Blue light laser has been commercialized using a semiconductor material of GaN series, and already utilized for a light source for a display. Up to now, in a semiconductor laser of GaN series, the oscillating wavelength is made longer so that laser oscillation has been confirmed near green light band. However, the GaN semiconductor laser of GaN series, including the commercialized blue laser, has a problem that its consuming electric power is large.

On the other hand, although a laser utilizing a wavelength converting device requires many number of parts for the fabrication, its consuming electric power is small and quality of beam emitted from its optical waveguide is good. The efficiency of utilization of light is thereby advantageously high even at an optical output same as that used for the semiconductor laser of GaN series. Further, as the wavelength is stable, it had the characteristic that measurement can be made at a low noise in an application of measurement.

Non-linear optical crystals used for a wavelength converting device and having non-linear optical effects include lithium niobate and lithium tantalate single crystals. Since such crystal has a high secondary non-linear optical constant, a periodic domain inversion configuration can be formed in the crystal to produce a Quasi-Phase-Matched (QPM) Secondary-Harmonic-Generation (SHG) device. Further, an optical waveguide may be formed in the periodic domain inversion configuration to produce a high efficient SHG device, leading to a wide variety of applications because its wavelength can be designed relatively freely to a wavelength suitable for a display as well as optical communication, medical, photochemical and various optical measurement fields.

However, as the inventors have tried to optically connect fundamental light to a waveguide type wavelength converting device to obtain a second harmonic wave, the oscillating output of the harmonic wave may become unstable.

According to Japanese Patent No. 4,646,333B, the applicant proposed that, in forming a periodic domain inversion structure in a ferroelectric substrate, a domain inversion face of the periodic domain inversion structure is inclined to a direction perpendicular to a propagating direction of fundamental wave to prevent return light.

Further according to Japanese Patent Publication No. 2012-118,528A, it was proposed that the domain inversion regions are similarly inclined to reduce back side reflection of propagating light.

SUMMARY OF THE INVENTION

The inventors have tried to optically connect a fiber grating to a solid phase laser oscillator to fabricate an external type resonator and to utilize the resonator for a light source of fundamental wave to oscillate a harmonic wave at a high efficiency. In this case, the fiber grating is used to reduce the deviation of wavelength of the fundamental wave as possible by accurately controlling a width of the wavelength of the fundamental wave. At the same time, it was tried to attain a high efficiency of wavelength conversion by improving the precision of the period of the periodic domain inversion structure. Since the deviation of the wavelength of the fundamental wave is prevented, it should have been prevented the reduction or unstableness of the efficiency of the wavelength conversion due to peak out, even in the case that the precision of production of the period is improved to reduce the width of the phase matching wavelength.

However, when it was actually fabricated, it was found that the oscillation output of the harmonic wave may be deviated over time. As the inventors have studied the cause of this phenomenon, it was found that the cause of the deviation of the output was not the minute deviation of the phase matching wavelength as described above but the oscillation of return light whose wavelength is slightly distant from the wavelength of the fundamental wave.

The inventors have further tried to incline the domain inversion plane with respect to a direction perpendicular to the propagating direction of the fundamental wave, as described in Japanese Patent No. 4, 646,333B and Japanese Patent Publication No. 2012-118,528A. However, although it was possible to prevent the reduction of the efficiency of wavelength conversion due to return light, it was proved to be difficult to obtain original high oscillation efficiency.

An object of the present invention is to prevent the reduction of efficiency of conversion due to feedback of the return light and to further improve an output power of a harmonic wave.

The present invention provides a wavelength converting device comprising a periodic domain inversion structure for oscillating a harmonic wave by converting a wavelength of a fundamental wave;

the wavelength converting device comprising a ferroelectric substrate and the periodic domain inversion structure formed therein;

wherein a vertical domain inversion boundary of the periodic domain inversion structure is inclined with respect to a normal line of an upper face of the ferroelectric substrate, provided that the ferroelectric substrate is viewed in a cross section parallel with a direction of propagation of a fundamental wave and parallel with the normal line of the upper face.

According to prior arts, for example as shown in a plan view of FIG. 3(a), an angle "α" of a horizontal domain inversion boundary PH and a propagating direction "OE" of light was slightly changed from the right angle to prevent the return light. According to the structure, however, in the case that the angle "α" is deviated from the right angle so as to sufficiently reduce the return light, the efficiency itself of the domain inversion would be reduced. It was thus proved that the improvement of the efficiency of the wavelength conversion as a whole is limited as a whole.

Although the reasons would not be clear, the following two kinds of speculations are presented.

First, a periodic domain inversion structure is conventionally formed by voltage application method. Here, the horizontal domain inversion boundary PH viewed from the upper face is made inclined with respect to a direction E perpendicular to the propagating direction OE of light on an upper face 11a of a ferroelectric substrate 11. Therefore, as the deviation between the horizontal domain inversion boundary PH and the direction E becomes larger, it is considered that the domain inversion is not efficiently performed and the domain inversion in the direction of depth would become difficult to take place.

Second, for improving the efficiency of connection to the semiconductor laser functioning as the fundamental wave, the width of the domain inverted part of the wavelength converting device tends to become larger than the thickness. According to the prior art shown in FIG. 3, the domain inversion boundary was inclined toward the longer width direction. It is thus considered that the shift of the time points at which the light pass through the inverted part becomes larger.

Contrary to this, according to the present invention, when the substrate of the ferroelectric material is viewed in a cross section parallel with a direction of propagation of a fundamental wave and parallel with the normal line of an upper face of the ferroelectric substrate, a vertical domain inversion boundary of the periodic domain inversion structure is inclined with respect to the normal line of the upper face. It is thus possible to reduce the deterioration in the domain inverted part as well as to sufficiently reduce the reduction of conversion efficiency due to the feedback of the return light, so that the output power of the harmonic wave as a whole can be further improved.

This can be speculated as follows. That is, the domain inversion boundary is inclined in a direction of the depth of the ferroelectric substrate, whose dimension is relatively short, so that the deviation of time required for light to pass through the inverted part is small.

BRIEF DESCRIPTION OF THE DRAWINGS

FIG. 1(a) is a plan view showing a bulk-type wavelength converting device 1 according to an embodiment of the present invention, and FIG. 1(b) is a cross sectional view showing the wavelength converting device 1 cut along a cross section parallel with a propagating direction "OE" of light and parallel with a normal line "O" of an upper face 2a.

FIG. 2(a) is a plan view of a wavelength converting device 10 of channel optical waveguide type according to an embodiment of the present invention, and FIG. 2(b) is a cross sectional view showing the wavelength converting device 10, cut along a cross section parallel with the propagating direction "OE" of light and parallel with the normal line "O" of an upper face 11a.

FIGS. 8(a), (b) and (c) are drawings illustrating patterns of domain inverted parts for forming a wavelength converting device.

FIGS. 9(a), (b) and (c) are drawings illustrating patterns of domain inverted parts for forming another wavelength converting device.

EMBODIMENTS FOR CARRYING OUT THE INVENTION

The present invention will be described below referring to the attached drawing.

According to prior arts, for example as shown in FIGS. 3(a) and (b), an optical waveguide 12 is formed on a side of an upper face of a ferroelectric substrate 11, and a periodic domain inversion structure 19 is formed therein. The periodic domain inversion structure 19 is composed of domain inverted parts 3A and non-domain inverted parts 4A alternately formed.

Besides, a boundary between the domain inverted part and non-domain inverted part is called a domain inversion plane. A boundary line obtained by viewing a domain inversion plane from the side of the upper face of the substrate is called a horizontal domain inversion boundary "PH". Further, a boundary line obtained by cutting the domain inversion plane along a cross section of the substrate described below is called the vertical domain inversion boundary "PV".

Here, according to prior arts, an angle "α" of the horizontal domain inversion boundary "PH" and the propagating direction "OE" of the light viewed from the side of the upper face 11a of the substrate was slightly shifted from the right angle to an acute angle for preventing the return light (refer to FIG. 3(a)). At this time, when viewed in a cross section (cross section shown in FIG. 3(b)) parallel with the propagating direction "OE" of light and parallel with the normal line "O" of the upper face 11a, the vertical domain inversion boundary "PV" was parallel with the normal line "O". That is, when viewed in the cross section elongating in the longitudinal direction of the substrate as shown in FIG. 3(b), the periodic domain inversion structure was not inclined.

However, as described above, such wavelength converting device may provide a limit on the improvement of the wavelength converting efficiency. The reason was speculated as follows. That is, as shown in FIG. 3(a), as the inclined angle "α" of the horizontal domain inversion boundary "PH" is made smaller than the right angle, the return light is accordingly reduced. However, as the inclined angle "α" becomes smaller, the domain inversion process in each domain inverted part 3A in the depth direction tends to be prevented as well as the deviation of time required for the light to pass through each domain inverted part 3A becomes larger, so that the overall wavelength converting efficiency is lowered. It is considered that this trade-off provides the limit on the improvement of the wavelength conversion efficiency.

According to an example shown in FIGS. 1(a) and (b), a periodic domain inversion structure 9 is formed between an upper face 2a and a bottom face 2b of a ferroelectric substrate 2 to form a bulk-type wavelength converting device 1. Domain inverted parts 3 and non-domain inverted part 4 are alternately arranged in a direction "OE" in which fundamental wave is propagated. 2c represents an incident face and 2d represent an emitting face.

Here, according to the present example, when viewed from the side of the upper face 2a of the ferroelectric substrate 2 (refer to FIG. 1(a)), the horizontal domain inversion boundary "PH" is substantially perpendicular to the direction "OE" in which the fundamental light is propagated. On the contrary, when viewed in a cross section (refer to FIG. 1(b)) parallel with the propagating direction "OE" of the fundamental wave and parallel with the normal line "O" of the upper face 2a, the vertical domain inversion boundary "PV" in the depth direction of the substrate is inclined with respect to the normal line "O".

As shown in FIG. 1(b), the vertical domain inversion boundary "PV" is not parallel with the normal line "O" of the upper face of the substrate viewed in the depth direction of the substrate, so that the return light can be reduced. At the same time, as shown in FIG. 1(a), the horizontal domain inversion boundary "PH" is perpendicular to the propagating direction "OE" of the fundamental wave when viewed from the side of the upper face.

According to a wavelength converting device 10 shown in FIGS. 2(a) and (b), a channel type optical waveguide 12 is formed in a ferroelectric substrate 11, and a periodic domain inversion structure 9 is formed between an upper face 11a and a bottom face 11b. Fundamental wave propagating in the optical waveguide 12 is subjected to wavelength conversion through the periodic domain inversion structure. Domain inverted parts 3 and non-domain inverted parts 4 are alternately arranged in the propagating direction "OE" of the fundamental light. 11c represents an incident face and 11d represents an emitting face.

According to the present example, when viewed from the side of the upper face 11a of the ferroelectric substrate 11 (refer to FIG. 2(a)), the horizontal domain inversion boundary "PH" is substantially perpendicular to the propagating direction "OE" of the fundamental light. On the contrary, when viewed in a cross section parallel with the propagating direction "OE" of the fundamental light and parallel with the normal line "O" of the upper face 11a (refer to FIG. 2(a)), the vertical domain inversion boundary "PV" is inclined with respect to the normal line "O".

Then, as shown in FIG. 2(b), the vertical domain inversion boundary "PV" is inclined with respect to the normal line "O", so that the return light is prevented. At the same time, as shown in FIG. 2(a), the horizontal domain inversion boundary "PH" is perpendicular to the propagating direction "OE" of the fundamental wave when viewed from the side of the upper face.

Figure 2:
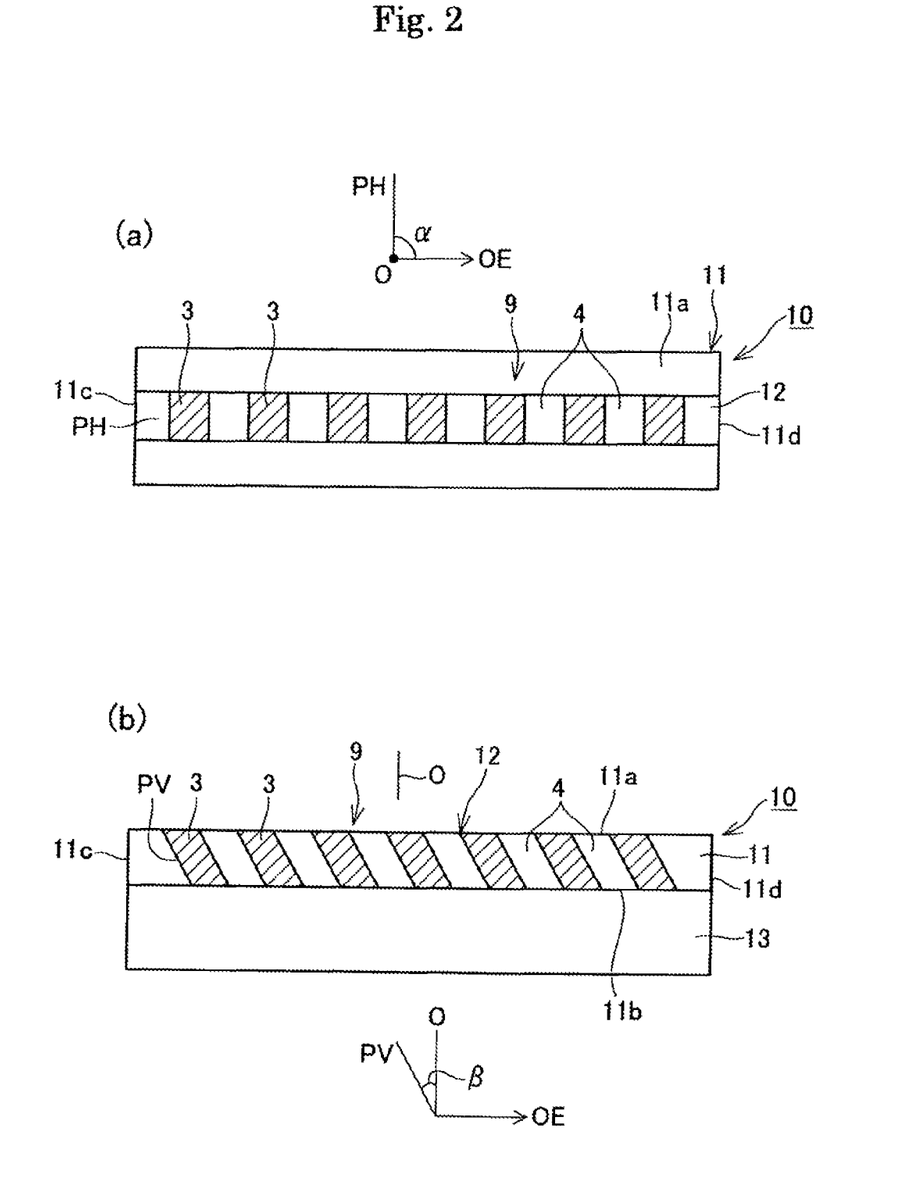

Further, as shown in FIG. 2, the bottom face 11b of the ferroelectric substrate 11 is adhered to a separate supporting body 13 to form an integrated wavelength converting device 10 as a whole.

The present invention will be further described in detail.

The wavelength converting device of the present invention converts a wavelength of a fundamental wave to oscillate a harmonic wave.

Although a laser light functioning as the fundamental wave is not particularly limited, it may preferably be a semiconductor laser, Nd-doped YAG laser or Nd-doped YVO$_4$ laser.

Further, although the wavelength of the fundamental wave is not particularly limited, the wavelength may generally be 660 to 2000 nm and particularly preferably be 710 to 1600 nm.

Although the wavelength of the harmonic wave is to be selected depending on the object, a second harmonic wave is preferred and third and fourth harmonic waves may be used.

The ferroelectric substrate includes an incident face of the fundamental wave, an emitting face of the fundamental and harmonic waves, the upper face and the bottom face, and the periodic domain inversion structure is formed therein.

The material of the ferroelectric substrate may preferably be a ferroelectric single crystal. Although it is not particularly limited as long as light modulation is possible, it includes lithium niobate, lithium tantalate, lithium niobate-lithium tantalate solid solution, lithium potassium niobate, KTP, GaAs, quartz and the like.

In order to further improve the resistance against optical damage of the optical waveguide, the ferroelectric single crystal may contain one or more metal element(s) selected from the group consisting of magnesium (Mg), zinc (Zn), scandium (Sc) and indium (In), and magnesium is especially preferable. Further a rare earth element may be contained as a dopant into the ferroelectric single crystal. The rare earth element functions as an additive element for laser oscillation. As the rare earth element, Nd, Er, Tm, Ho, Dy and Pr are especially preferable.

The periodic domain inversion structure may be formed within the channel type optical waveguide. In this case, the channel type optical waveguide may be included in a waveguide converting device of ridge type protruding from a joining layer or a substrate. Such wavelength converting device can be obtained by physically processing and molding a non-linear optical crystal, by a process such as mechanical processing or laser processing. Then, the channel type optical waveguide is joined to a substrate through an adhesive layer composed of a non-crystalline material. Alternatively, the optical waveguide is formed by metal diffusion process, such as titanium diffusion or proton exchange process.

Further, the channel type optical waveguide may be formed in a Y-plate or off-cut Y-plate (X-plate, off-cut X-plate) composed of a ferroelectric single crystal.

Further, the periodic domain inversion structure may be provided in a bulk substrate of a ferroelectric single crystal. Further, the fundamental wave and harmonic wave propagate within the bulk-type ferroelectric substrate in slab mode.

According to a preferred embodiment, for example as shown in FIG. 2, the bottom face of the ferroelectric substrate may be adhered to the supporting body, and in this case, the adhesive layer may be provided.

Further, an under clad and over clad may be provided to the ferroelectric substrate. The material of the under clad or over clad includes silicon oxide, magnesium oxide, silicon nitride, alumina and tantalum pentoxide.

The material of the adhesive layer may be an inorganic adhesive, an organic adhesive or a combination of the organic and inorganic adhesives.

A specific material of the supporting body 13 is not particularly limited, and includes lithium niobate, lithium tantalite, a glass such as quartz glass, quartz, Si or the like. In this case, on the viewpoint of difference of thermal expansion, the ferroelectric substrate and supporting body may preferably be made of the same material, which is particularly preferably be lithium niobate single crystal.

According to the present invention, when viewed in a cross section parallel with the propagating direction "OE" of the fundamental light and parallel with the normal line "O" of the upper face 2a, 11a of the ferroelectric substrate, the vertical domain inversion boundary "PV" of the periodic domain inversion structure is inclined with respect to the normal line "O" of the upper face 2a, 11a.

An inclined angle "β" between the normal line "O" of the upper face 2a, 11a and the vertical domain inversion boundary "PV" may preferably be 1° or larger and more preferably be 3° or larger, on the viewpoint of improving the efficiency of harmonic wave generation due to the reduction of the return light. Further, as the inclined angle "β" becomes large, the efficiency of wavelength conversion is reduced, and on the viewpoint, the inclined angle may preferably be 25° or smaller and more preferably be 15° or smaller.

Figure 1:
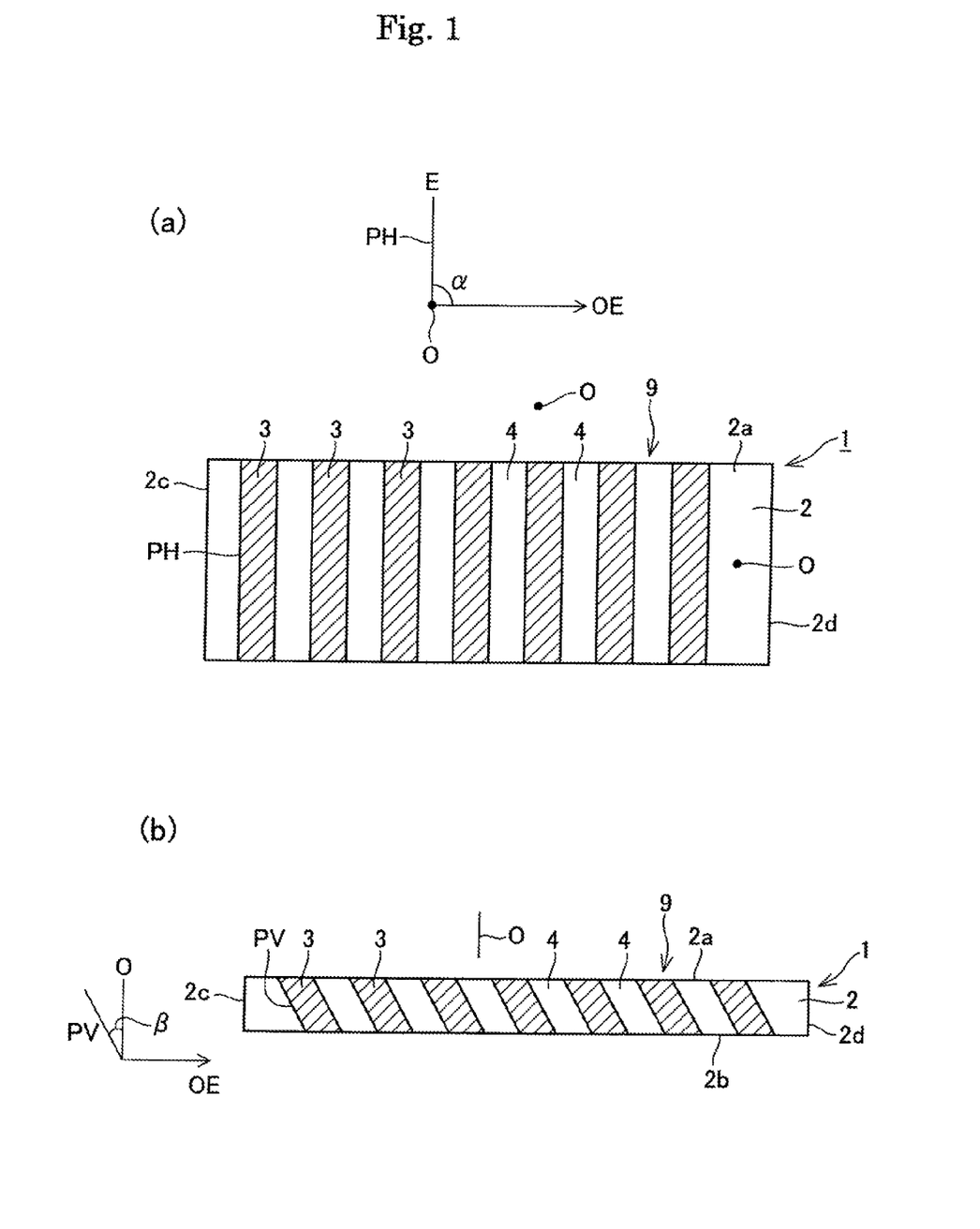

According to a preferred embodiment, when the ferroelectric substrate is viewed from the upper face in a plan view, the propagating direction of the fundamental wave and the horizontal domain inversion boundary "PH" is substantially perpendicular to each other. FIGS. 1 and 2 relate to this embodiment, in which the propagating direction "OE" of the fundamental wave and the vertical domain inversion boundary "PV" are intersected at an angle "α" of substantially right angle. Here, "α" is not necessarily 90° in the strict sense of word, and a tolerance of the production is to be allowed.

Then, another specific embodiment of the ferroelectric substrate for the present invention will be described further, referring to FIGS. 4 to 8.

Figure 5:
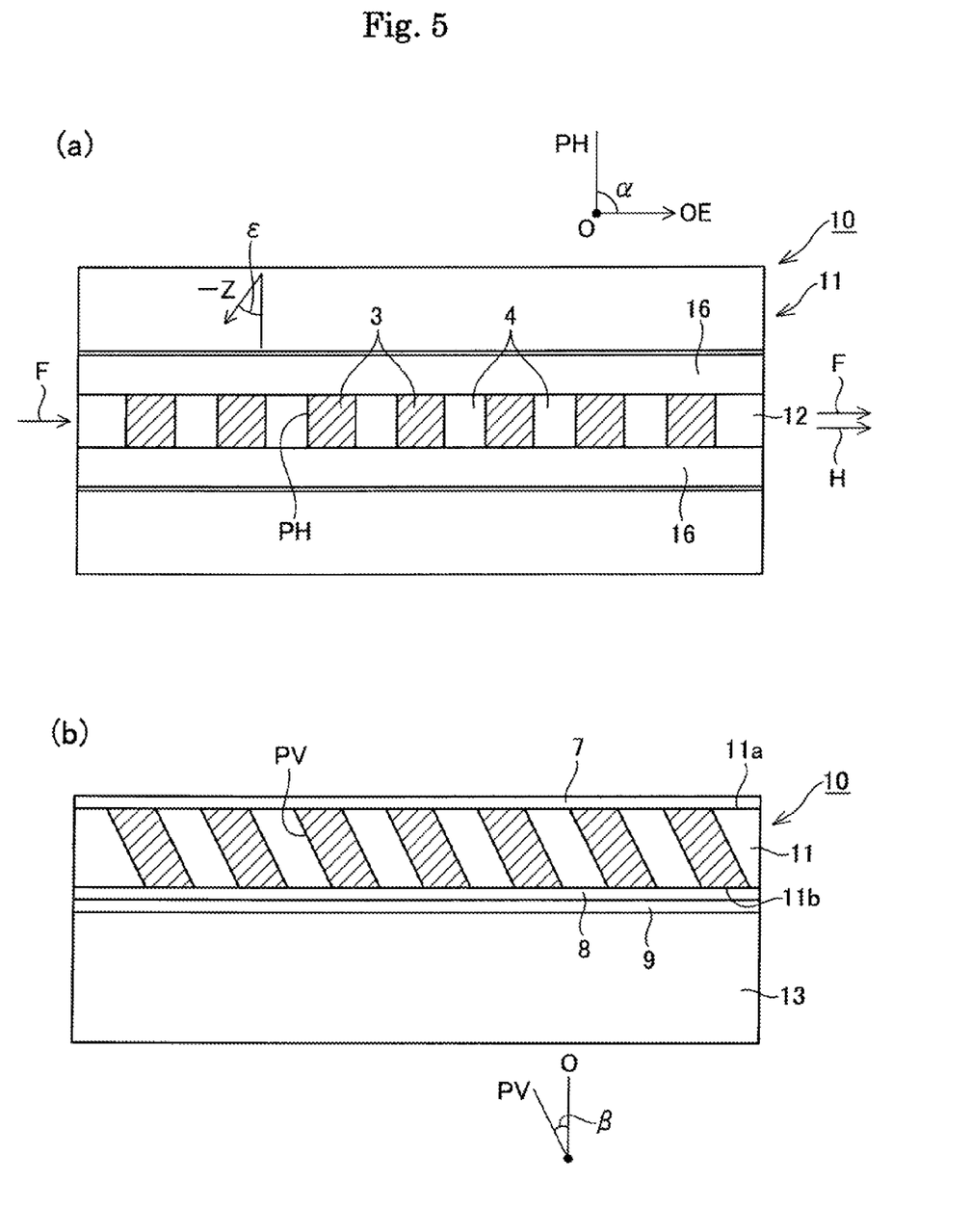
FIG. 5(a) is a plan view showing the wavelength converting device 10 according to an embodiment.
FIG. 5(b) is a cross sectional view of the wavelength converting device 10 of FIG. 5(a).
Figure 6:
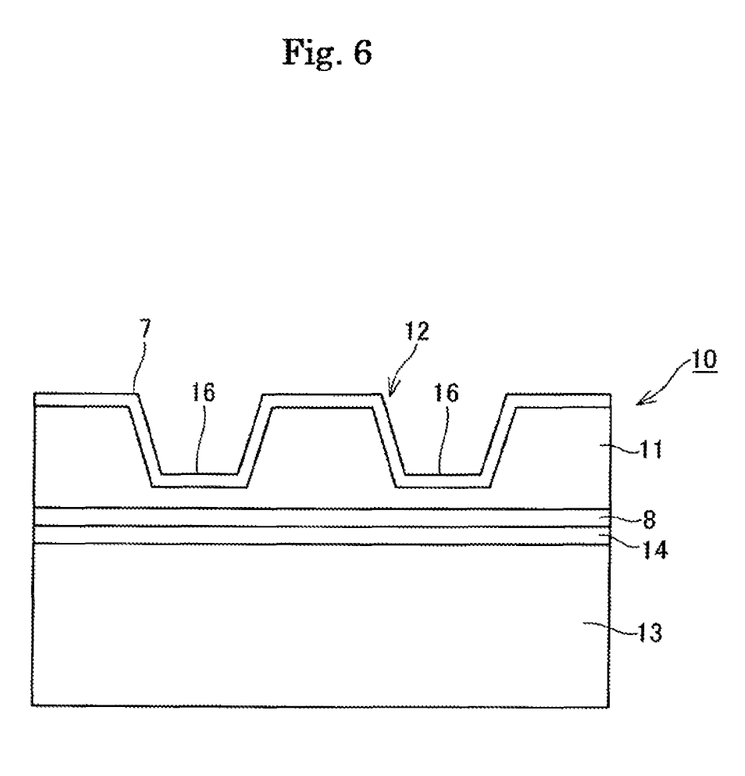
FIG. 6 is a cross sectional view showing the wavelength converting device 10 of FIG. 5 cut in a direction of the width of the ferroelectric substrate perpendicular to the propagating direction "OE" of fundamental wave.
Figure 7:
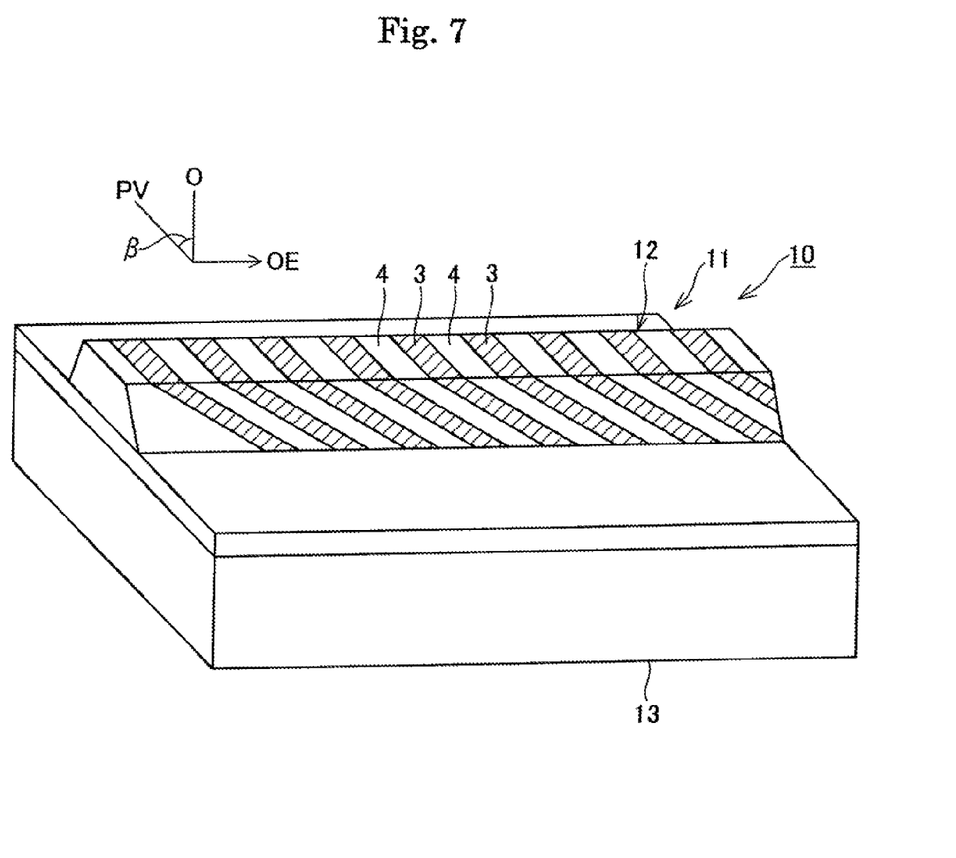
FIG. 7 is a perspective view schematically showing the wavelength conversing device shown in FIGS. 5 and 6.
Figure 8:
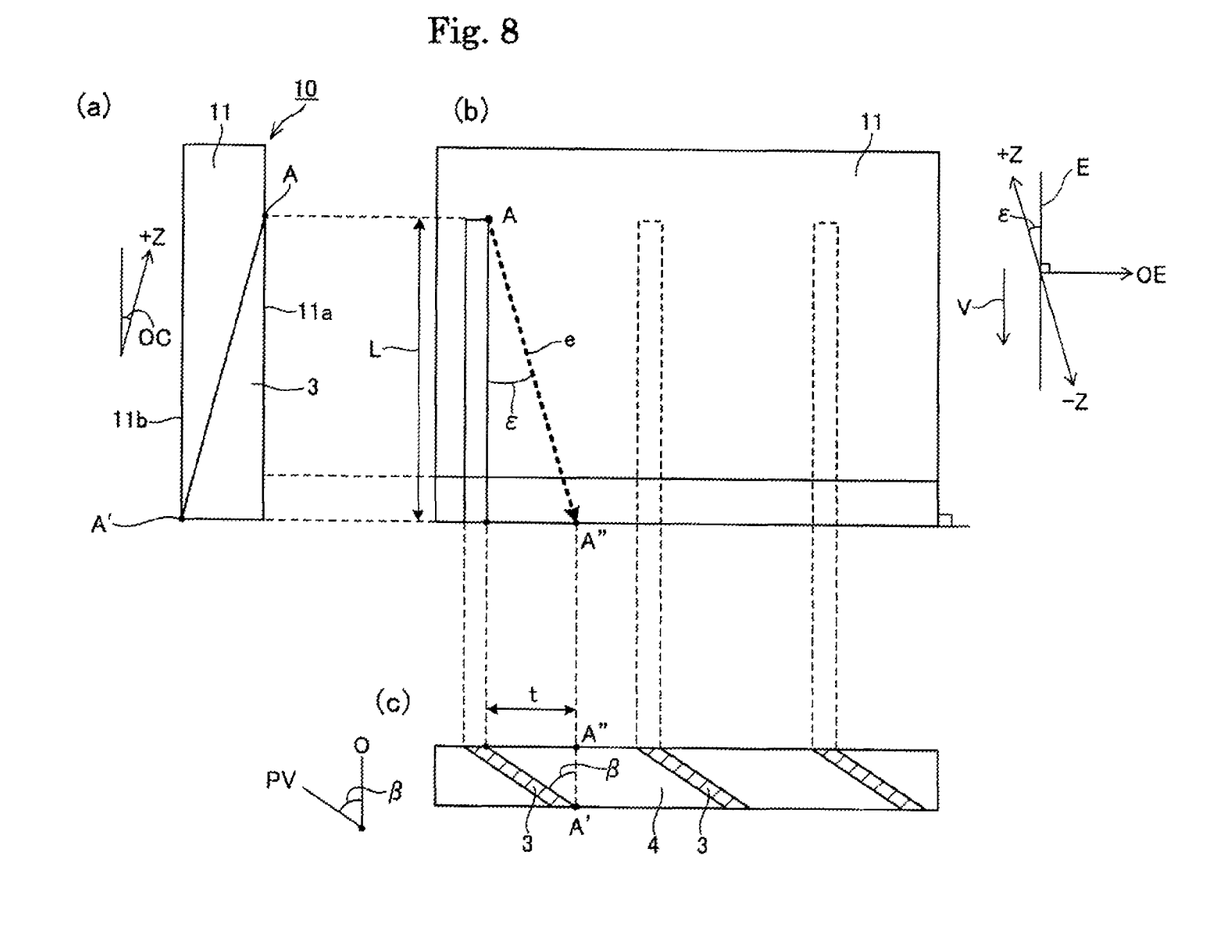

According to the present embodiment, as shown in FIGS. 5 to 7, a bottom face 11b of a ferroelectric substrate 11 is adhered to a separate supporting body 13 through an adhesive layer 14.

Here, the periodic domain inversion structure of the present invention is formed in the ferroelectric substrate 11. The forming method will be described below referring to FIGS. 4, 8 and 10. Besides, since each inclined angle of each axis is too small in FIG. 4 to distinguish at a first glance, each inclined angle is exaggerated in FIG. 8 for facilitating the comprehension.

Figure 10:
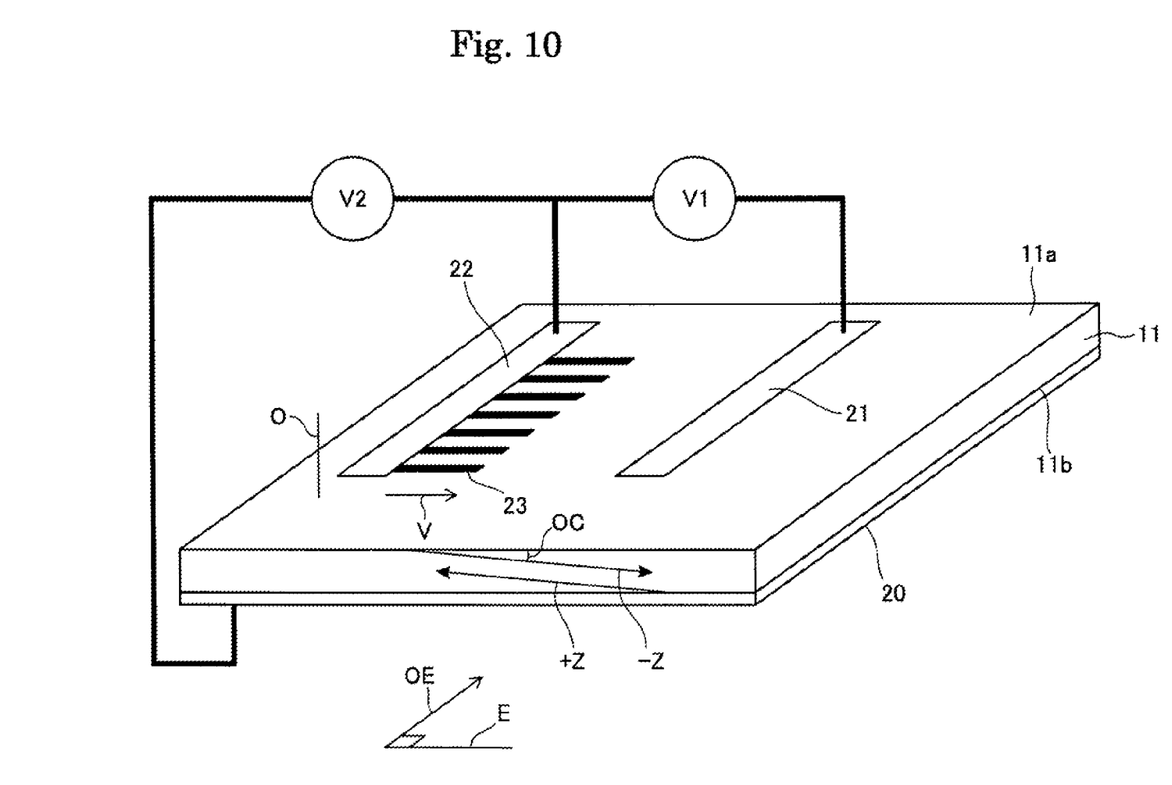
FIG. 10 is a perspective view schematically showing examples of construction for forming a periodic domain inversion structure by voltage application method.

Here, an off-cut Y-plate is used as the ferroelectric substrate 11, and the direction of the poling axis (Z axis) is inclined with respect to the upper face 11a of the ferroelectric substrate. That is, as shown in FIGS. 4(a), 8(a) and 10, the poling axis is inclined with respect to the surface 11a by an angle "OC". The inclined angle "OC" is called an off-cut angle.

A comb like electrode 22 and a counter electrode 21 are formed on the upper face 11a of the ferroelectric substrate 11, and many elongate electrode pieces 23 are formed from the comb like electrode toward the counter electrode 21. Reference "V" represents the longitudinal direction of the electrode piece 23. Further, an uniform electrode 20 is formed on the bottom face 11b of the ferroelectric substrate 11. According to the present example, the longitude direction "V" of the electrode piece 23 is perpendicular to the propagating direction "OE" of the light.

A voltage "V2" is applied between the comb like electrode 22 and the counter electrode 20 to form the periodic domain inversion structure. Further, a voltage "V1" is applied on the counter electrode 21, or the counter electrode 21 is made a floating electrode.

Besides, reference "E" represents the direction perpendicular to the propagating direction "OE" of the light on the upper face 11a of the ferroelectric substrate 11.

Further, as shown in a plan view of FIGS. 4(b) and 8(b), as the Z-axis is projected onto the upper face 11a, the Z-axis projected on the upper face 11a is inclined with respect to the direction "E" perpendicular to the propagating direction "OE" of the light by an angle "ε" on the upper face 11a. Further, the direction of the Z-axis projected on the upper face 11a is inclined with respect to the longitudinal direction "V" of the electrode piece 23 by an angle "ε".

Besides, FIG. 8(a) shows the Z-axis and off-cut angle "OC". However, strictly speaking, the Z-axis projected on the upper face 11a is inclined with respect to the direction "E" perpendicular to the propagating direction "OE" of the light by an angle "ε" on the upper face 11a, as shown in FIG. 8(b). As a result, on the face shown in FIG. 8(a), it is shown a projected figure obtained by projecting the Z-axis on the face, and the off-cut angle projected of the face of the FIG. 8(a) is somehow different from "OC". However, for the ease of explanation, the Z-angle and off-cut angle "OC" themselves are shown in FIG. 8(a).

According to the present example, as shown in FIG. 8(a), +Z axis is directed toward the upper face 11a and the polarization inversion process is advanced toward the direction of −Z axis. On the other hand, as shown in FIGS. 4(b) and 8(b), the longitudinal direction "V" of the electrode piece of the comb like electrode is made parallel with the direction "E" perpendicular to the propagating direction "OE" of the light on the upper face 11a.

The polarization inversion is advanced toward the inside of the substrate in the direction inclined by the off-cut angle "OC" (direction of Z axis), as shown in FIG. 8(a).

As a result, the polarization inversion is started from, for example, point A on the upper face advances toward point A' on the side of the bottom face of the substrate and pass through the point A'. That is, the polarization inversion progresses from the point A toward the point A' viewed three-dimensionally.

By projecting the direction of the polarization inversion from the point A toward the point A' on the upper face 11a, it is obtained the projected direction "e" of the polarization inversion (refer to FIGS. 4(a) and 8(a)). Therefore, the direction "e" obtained by projecting the direction in which the polarization inversion progresses on the upper face 11a is inclined with respect to the longitudinal direction "V" of the electrode piece by the angle "ε" and inclined with respect to the direction "E" perpendicular to the propagating direction of the light on the upper face 11a by the angle "ε".

As a result, it is provided a positional shift "t" between point A" obtained by projecting the point A' onto the upper face 11a (refer to FIGS. 4(d) and 8(c)) and the electrode. This positional shift "t" corresponds to an inclined angle "β" of the vertical domain inversion boundary "PV" in the cross section of the ferroelectric substrate.

This inclined angle "β" is decided by the positional shift "t" and a thickness of the substrate. Since a thickness of the domain inversion part (a length in the direction of the normal line "O") is shorter than the length "L" of the domain inversion part in the direction "E", the angle "β" can be made large even when the positional shift "t" is small. As the positional shift "t" is small, it is possible to reduce the deviation of time required for the light to pass through the inverted part.

Besides, although FIGS. 4(a) and 8(a) show the points A and A', the direction "e" obtained by projecting the direction of polarization inversion onto the upper face 11a is actually inclined with respect to the direction "E" by the angle "ε", as shown in FIGS. 4(b) and 8(b). Therefore, in the case that the point A is shown on the plane of FIGS. 4(a) and 8(a), strictly speaking, the point A' is present on the position distant from the plane of FIGS. 4(a) and 8(a) by the positional shift "t" and thus not shown on the plane of FIGS. 4(a) and 8(a). However, the points A and A' are shown in FIGS. 4(a) and 8(a) for the convenience of explanation.

Besides, for example as shown in FIGS. 5 and 6, an over clad 7 may be provided on the upper face 11a of the ferroelectric substrate 11. Further, an under clad 8 may be formed on the bottom face 11b of the ferroelectric substrate 11.

Further, for forming the channel type optical waveguide, for example as shown in FIG. 6, a pair of grooves 16 may be formed to form the ridge type optical waveguide 12 between them. The periodic domain inversion structure is formed within the optical waveguide 12 according to the present invention. Besides, a diffused part may be formed within the optical waveguide 12 by inner diffusion process. Besides, in FIGS. 5(a) and 4(c), "F" represents the fundamental wave and "H" represents the harmonic wave.

Further, when the ferroelectric substrate is viewed from the upper face in a plan view, the propagating direction of the fundamental light and the horizontal domain inversion boundary "PH" may be intersected at an acute angle. That is, the propagating direction "OE" of the fundamental wave and the horizontal domain inversion boundary "PH" may be intersected at an angle "α", as shown in FIG. 1(a), which is an acute angle.

When the angle "α" of the propagating direction "OE" of the fundamental wave and the horizontal domain inversion boundary "PH" is made an acute angle, the vertical domain inversion boundary "PV" may be inclined with respect to the normal line "O" of the upper face by the angle "β" at the same time so that it is possible to reduce the return light at the angle "α" nearer to the right angle than that required according to the prior arts.

Figure 9:
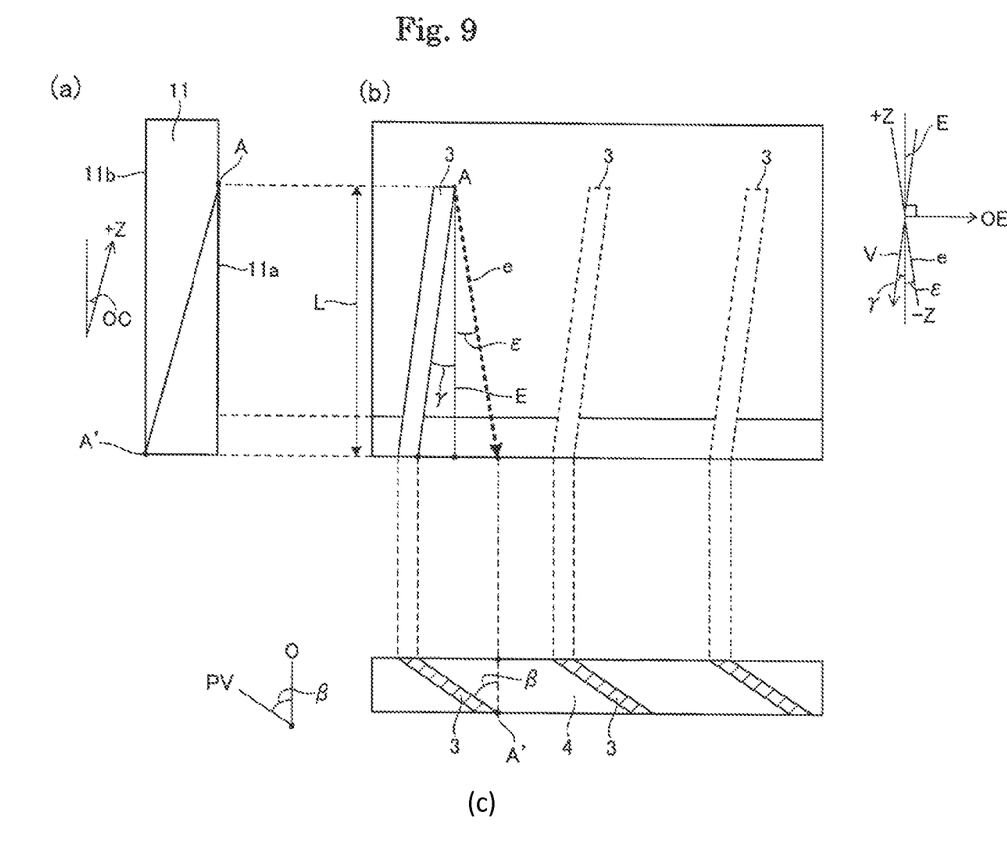

FIG. 9 relates to this embodiment. According to this embodiment, the periodic domain inversion structure according to the present invention is formed in the ferroelectric substrate 11. The forming method will be described below. Besides, each inclined angle is exaggerated in FIG. 9 for facilitating the comprehension.

Here, an off-cut Y-plate is used as the ferroelectric substrate 11. As shown in FIG. 9(a), the poling axis (Z axis) is inclined with respect to the substrate surface 11a by the angle "OC". The inclined angle "OC" is called an off-cut angle.

Here, as shown in a plane view of FIG. 9(b), when the Z axis is projected onto the upper face 11a of the substrate, the Z axis projected on the upper face 11a is inclined with respect to the direction "E" substantially perpendicular to the propagating direction "OE" of the light on the upper face 11a by the angle "ε".

Besides, the Z axis and off-cut angle "OC" are shown in FIG. 9(a) for the convenience of explanation, similarly as FIG. 8(a).

According to the present example, as shown in FIG. 9(a), +Z axis is directed toward the upper face 11a and the polarization inversion is advanced toward the direction of −Z axis. On the other hand, as shown in FIG. 9(b), the longitudinal direction "V" of the electrode piece of the comb like electrode is made inclined with respect to the direction "E" by an angle "γ".

Then, a voltage is applied through the comb electrode on the upper face of the substrate to progress the polarization inversion process.

Then, the polarization inversion is progressed toward the inside of the substrate in the direction inclined by the off-cut angle "OC", as shown in FIG. 9(a).

For example, the polarization inversion process starting from the point A on the upper face progresses toward the point A' on the side of the bottom face of the substrate and is then terminated at the point A'. That is, the polarization inversion process progresses from the point A to the point A' when viewed three dimensionally. The angle "α" of the propagating direction "OE" of the fundamental wave and the horizontal domain inversion boundary "PH" can be made an acute angle and, at the same time, the vertical domain inversion boundary "PV" can be inclined with respect to the normal line "O" of the upper face by the angle "β".

Besides, although FIG. 9(a) show the points A and A', the direction "e" obtained by projecting the direction of polarization inversion onto the upper face 11a is actually inclined with respect to the direction "E" by the angle "ε", as shown in FIG. 9(b). However, the points A and A' are shown in FIG. 9(a) for the convenience of explanation.

According to the present embodiment, although "α" is not particular limited as far as it is less than 90°, on the viewpoint of synergistic effects of it with the inclined angle "β" in the direction of the cross section described later, "α" may preferably be 89.9% or smaller and more preferably be 89.7° or smaller. Further, as "α" becomes too small, the domain inversion efficiency is rather lowered so that the wavelength converting efficiency tends to become lower. On the viewpoint, "α" may preferably be 88° or larger and more preferably be 89° or larger.

EXAMPLES

Example A1

It was fabricated the wavelength converting device having the shape shown in FIGS. 1 to 8.

Specifically, a comb like electrode and a counter electrode were formed on a upper face and an uniform electrode is formed on a bottom face of an off-cut Y plate having a thickness of 0.5 mm and of MgO 5% doped lithium niobate. A periodic domain inversion structure having a period of 5.08 µm was formed by voltage application method.

On the other hand, an adhesive was applied on a substrate of a non-doped lithium niobate and having a thickness of 0.5 mm. Then, it was adhered onto the MgO-doped lithium niobate substrate, and the surface of the MgO-doped lithium niobate substrate was ground and polished to a thickness of 3.5 µm to produce a thin plate.

Then, a channel type optical waveguide of ridge type was formed on the thin plate by laser ablation process. After forming the optical waveguide, it was formed an over clad of $SiO_2$ and having a thickness of 0.5 g m by sputtering. The thus fabricated wavelength converting device was cut by a dicer into chips each having a length of 9 mm and a width of 1.0 mm, and its end faces were polished and provided with anti-reflection coatings.

The conditions were shown below.

| | |
|---|---|
| "OC" | 5° |
| "ε" | 0.5° |
| "L" | 40 µm |
| "t" | 0.35 µm |
| "β" | 5.7° |

The optical characteristics of the thus obtained wavelength converting device were measured using a semiconductor laser. An oscillating output power from the laser light source was adjusted at 350 mW, and its fundamental light was input into an end face of the waveguide using a lens to obtain an SHG output power of 82 mW. The wavelength of the fundamental wave at this time was proved to be 976.1 nm. The measurement was performed at room temperature (25° C.). The state of oscillation of the semiconductor laser light was stable and deviation of output power was not observed.

Examples A2 to A5

Wavelength converting devices were produced according to the same procedure as the Example A1. However, each parameter was changed as follows.

| | | |
|---|---|---|
| ε: | 0.1° (Example A2); | 0.3° (Example A3) |
| | 1° (Example A4); | 2° (Example A5) |
| t: | 0.07 µm (Example A2); | 0.21 µm (Example A3) |
| | 0.7 µm (Example A4); | 1.4 µm (Example A5) |
| β: | 1.1° (Example A2); | 3.4° (Example A3) |
| | 11° (Example A4); | 22° (Example A5) |

The oscillating output power was measured as the Example A1, and the following SHG output powers were obtained. The wavelength at this time was proved to be 975.9 to 976.4 m. The measurement was performed at room temperature (25°

C.). The differences of the wavelengths of the fundamental waves were due to the deviation of thickness of the MgO-doped lithium niobate substrates fabricated for the respective examples. The state of oscillation of the semiconductor laser light was stable and deviation of output power was not observed in each of the examples.

| | |
|---|---|
| Example A2; | 84 mW |
| Example A3; | 83.5 mW |
| Example A4; | 76 mW |
| Example A5; | 61 mW |

Comparative Example 1

A wavelength converting device was produced according to the same procedure as the Example A1.

Figure 3:
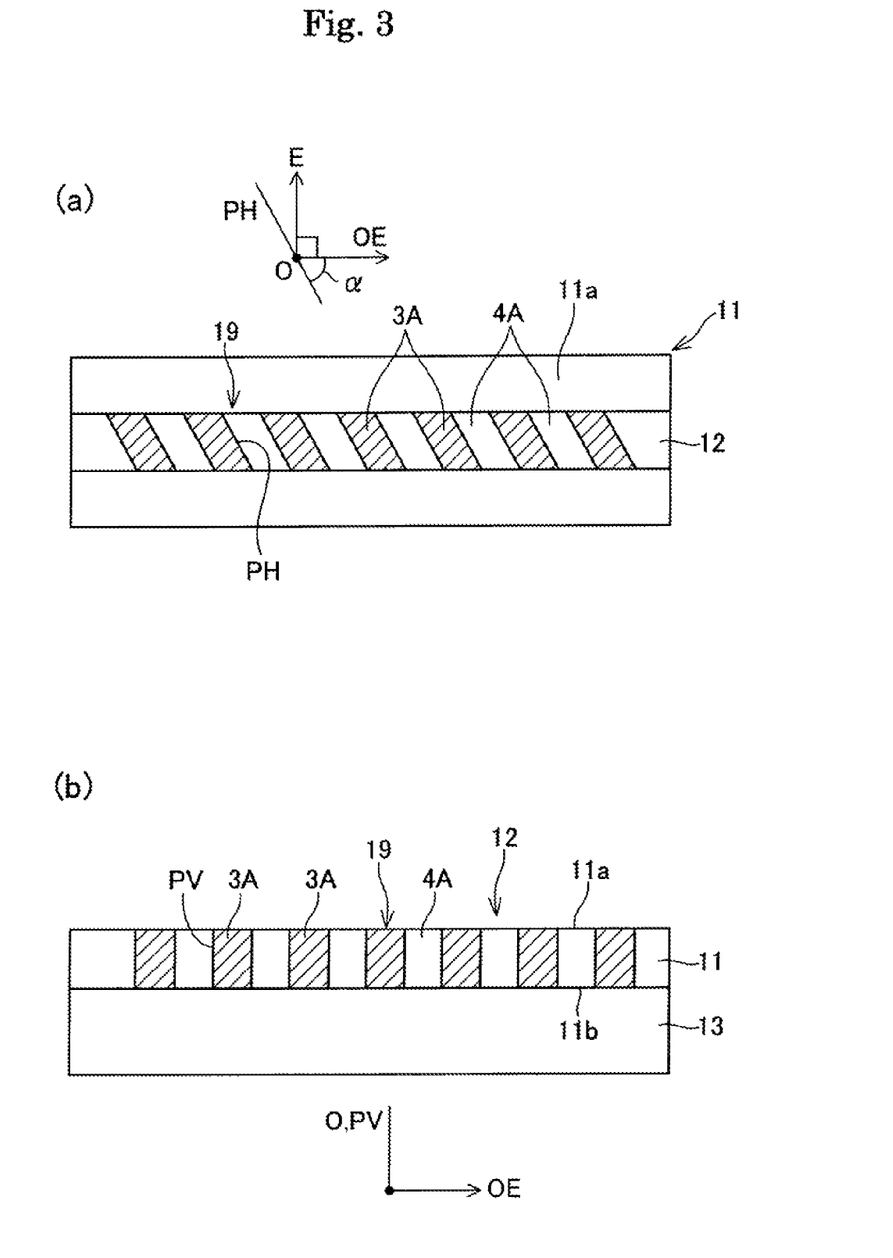
FIG. 3(a) is a plan view showing a wavelength converting device of channel optical waveguide type according to a comparative example.
FIG. 3(b) is a cross sectional view showing the wavelength converting device.
Figure 4:
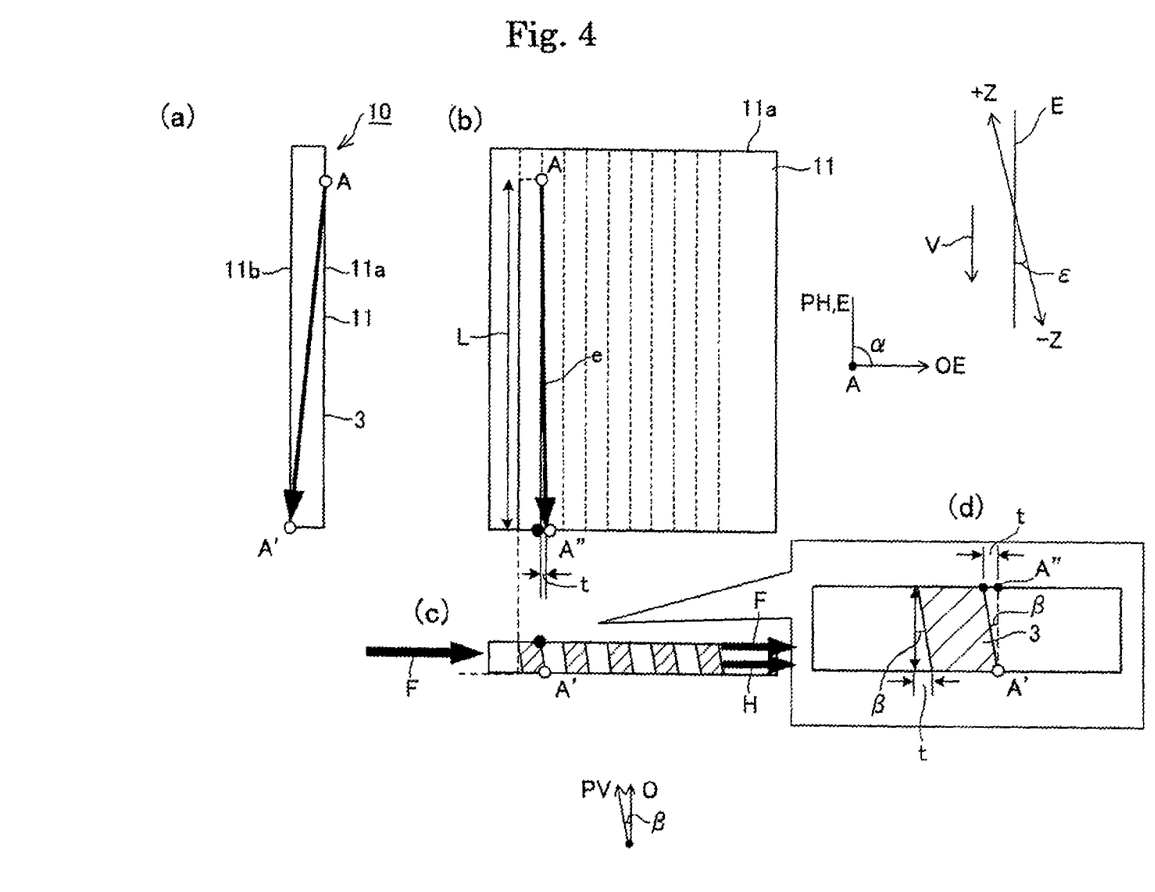
FIG. 4(a) is a cross sectional view schematically showing the wavelength converting device 10 according to an embodiment of the present invention.
FIG. 4(b) is a plan view of the wavelength converting device 10.
FIG. 4(c) is cross sectional view schematically showing the wavelength converting device 10 cut along a cross section parallel with the propagating direction "OE" of light and parallel with the normal line "O" of the upper face.
FIG. 4(d) is an enlarged view of FIG. 4(c).

However, different from the Example A1, as shown in FIG. 3, the angle "α" was made 84.3°. In addition to this, the direction "V" of the applied voltage and the propagating direction "OE" of the light were perpendicular to each other.

The SHG oscillating power was measured according to the same procedure as the Example A1 to prove that the SHG output power was 49.7 mW at the wavelength of the fundamental wave of 976.4 nm. The measurement was performed at room temperature (25° C.). The state of oscillation of the semiconductor laser light was stable and deviation of output power was not observed.

Example B1

A wavelength converting device was produced according to the same procedure as the Example A1. However, the construction shown in FIG. 9 was applied. The respective parameters were changed as follows.

| |
|---|
| OC: 5°, ε: 0.2°, γ: 0.3° |
| L: 40 μm, β: 5.7° |

The SHG oscillating power was measured according to the same procedure as the Example A1 to prove that the SHG output power was 82.5 mW at the wavelength of the fundamental wave of 976.2 nm. The measurement was performed at room temperature (25° C.). The state of oscillation of the semiconductor laser light was stable and deviation of output power was not observed.

Examples B2 to B5

Wavelength converting devices were fabricated according to the same procedure as the Example A1. The respective parameters were changed as follows.

| | | |
|---|---|---|
| ε: | 0.2° (Example B2); | 0.2° (Example B3) |
| | 0.2° (Example B4); | 0.2° (Example B5) |
| γ: | 0.1° (Example B2); | 0.5° (Example B3) |
| | 1° (Example B4); | 2° (Example B5) |
| β: | 3.4° (Example B2); | 8° (Example B3) |
| | 13.5° (Example B4); | 24° (Example B5) |

The SHG oscillating power was measured according to the same procedure as the Example A1, and the following SHG output powers were obtained at the wavelengths of the fundamental waves of 975.9 to 976.5 nm. The measurement was performed at room temperature (25° C.). The differences of the wavelengths of the fundamental waves were due to the deviation of thicknesses of the MgO-doped lithium niobate substrates fabricated for the respective examples. The state of oscillation of the semiconductor laser light was stable and deviation of output power was not observed.

| | |
|---|---|
| Example B2: | 84 mW |
| Example B3: | 81.5 mW |
| Example B4: | 73 mW |
| Example B5: | 58 mW |

The invention claimed is:

1. A wavelength converting device comprising a periodic domain inversion structure for converting a wavelength of a fundamental wave to generate a harmonic wave;
    said fundamental wave being oscillated from a laser light source,
    said wavelength converting device comprising a ferroelectric substrate and said periodic domain inversion structure formed in said ferroelectric substrate,
    said ferroelectric substrate comprising an upper face, a bottom face, an incident face to which said fundamental wave is made incident and an emitting face;
    wherein a vertical domain inversion boundary of said periodic domain inversion structure is inclined with respect to a normal line of an upper face of said ferroelectric substrate, provided that said ferroelectric substrate is viewed in a cross section parallel with a propagating direction of said fundamental wave and parallel with said normal line of said upper face
    said vertical domain inversion boundary of said periodic domain inversion structure is inclined with respect to said upper face of said ferroelectric substrate, provided that said ferroelectric substrate is viewed in a cross section perpendicular to said propagating direction of said fundamental wave; and
    wherein said ferroelectric substrate comprises an off-cut Y-plate.

2. The wavelength converting device of claim 1, wherein said vertical domain inversion boundary is inclined with respect to said normal line of said upper face of said ferroelectric substrate at an inclined angle of 3 to 25°.

3. The wavelength converting device of claim 1, wherein said propagating direction of said fundamental wave is substantially perpendicular to a horizontal domain inversion boundary of said periodic domain inversion structure, provided that said ferroelectric substrate is viewed from said upper face in a plan view.

4. The wavelength converting device of claim 1, wherein said propagating direction of said fundamental wave and a horizontal domain inversion boundary of said periodic domain inversion structure intersect each other at an acute angle, provided that said ferroelectric substrate is viewed from said upper face in a plan view.

5. The wavelength converting device of claim 1, further comprising a supporting body, and an adhesive layer for adhering a bottom face of said ferroelectric substrate to said supporting body.

6. The wavelength converting device of claim 1, wherein said ferroelectric substrate comprises a channel type optical waveguide, and wherein said periodic domain inversion structure is formed in said channel type optical waveguide.

7. The wavelength converting device of claim 1, wherein said ferroelectric substrate comprises a slab type optical waveguide, and wherein said periodic domain inversion structure is formed in said slab type optical waveguide.

* * * * *